(12) United States Patent
Gosse

(10) Patent No.: US 9,057,470 B1
(45) Date of Patent: Jun. 16, 2015

(54) OFFSET CONDUIT BODY

(71) Applicant: Robert Gosse, Dover, NH (US)

(72) Inventor: Robert Gosse, Dover, NH (US)

(*) Notice: Subject to any disclaimer, the term of this patent is extended or adjusted under 35 U.S.C. 154(b) by 0 days.

(21) Appl. No.: 13/851,443

(22) Filed: Mar. 27, 2013

(51) Int. Cl.
*F16L 41/02* (2006.01)

(52) U.S. Cl.
CPC .................................. *F16L 41/02* (2013.01)

(58) Field of Classification Search
CPC .................. F16L 41/03; F16L 41/021
USPC ............. 285/126.1, 129.1, 130.1, 64, 133.11, 285/149.1, 154.1
See application file for complete search history.

(56) References Cited

U.S. PATENT DOCUMENTS

| | | | | | |
|---|---|---|---|---|---|
| 770,539 | A | * | 9/1904 | Ryan | 285/129.1 |
| 796,377 | A | * | 8/1905 | Walker | 285/129.1 |
| 846,600 | A | * | 3/1907 | Oakes | 285/129.1 |
| 849,383 | A | * | 4/1907 | Fruin | 285/129.1 |
| 853,413 | A | * | 5/1907 | Kimche | 285/129.1 |
| RE12,688 | E | * | 8/1907 | Oakes | 285/130.1 |
| 1,165,127 | A | * | 12/1915 | Rock | 285/129.1 |
| 1,166,005 | A | * | 12/1915 | Robinett et al. | 285/129.1 |
| 1,473,439 | A | * | 11/1923 | Marsh | 285/130.1 |
| 1,928,628 | A | * | 10/1933 | McDermott | 285/129.1 |
| 2,237,672 | A | * | 4/1941 | Kennedy | 285/129.1 |
| 2,476,908 | A | * | 7/1949 | Radcliffe | 285/129.1 |
| 2,570,525 | A | * | 10/1951 | Collison | 285/129.1 |
| 2,666,211 | A | * | 1/1954 | Schmid | 285/129.1 |
| 2,795,798 | A | * | 6/1957 | Boggess et al. | 285/129.1 |
| 2,916,310 | A | * | 12/1959 | Manas | 285/129.1 |
| 3,156,490 | A | * | 11/1964 | Myll | 285/133.11 |
| 3,346,887 | A | * | 10/1967 | Sommer | 285/129.1 |
| 3,495,281 | A | * | 2/1970 | Palowsky | 285/129.1 |
| 4,449,741 | A | * | 5/1984 | Litvin et al. | 285/129.1 |
| 4,508,371 | A | * | 4/1985 | Maier | 285/126.1 |

* cited by examiner

*Primary Examiner* — David E Bochna
(74) *Attorney, Agent, or Firm* — Joseph E. Funk

(57) ABSTRACT

The invention is a novel offset conduit body that has T-type, L-type and X-type conduit body variants. The T-style conduit body has an offset port the axis of which is perpendicular to the co-linear axis of the other two ports, but the axis of the offset port does not lie in a common plane with the axis of the other two ports, and this offset eliminates the need for bending conduit connected to the offset port in order for that conduit to pass over or under different conduit that is adjacent to the T-style conduit body and is parallel to the conduit connected to the other two ports. The L-style conduit body has a first and an offset port oriented at right angles to each other and the axis of the two ports are offset from each other so they do not lie in a common plane, and the offset eliminates the need for bending conduit connected to the offset port in order for that conduit to pass over or under adjacent conduit that is parallel to the conduit connected to the first port. The X-type conduit body has two collinear ports in one plane and two collinear ports in an offset plane.

12 Claims, 5 Drawing Sheets

OFFSET CONDUIT BODY

FIELD OF THE INVENTION

This invention relates to fittings and boxes for electrical wiring and conduits, and more particularly to an electrical conduit body for joining 90° runs of conduit and wiring.

BACKGROUND OF THE ART

In a typical commercial electrical construction application, conduit is installed first within a raceway and the conduit houses and protects the wiring. A component known as a conduit body is used at the junction of two or more conduits to join the conduits together. The conduit body has a removable cover to provide access to the interior. A conduit body that provides for a 90° juncture or bend in the conduit and wiring is known as an L-type conduit body. A conduit body that provides for a juncture of three conduits is known as an T-type conduit body. When the conduit and wiring is diverted through an opening opposite the cover, the conduit body is known as an LB conduit body. When the conduit and wiring is diverted 90° through the left side or the right side of the conduit body, the conduit body is known as an LL or LR type. A conduit body that provides for a juncture of four conduits is known as an X-type conduit body.

Conduit bodies are often used as junction points or pull points. For example, when used as a pull point, the cover is removed from the conduit body and the wire is pulled through one conduit to the entrance opening of the conduit body and out of the top of the conduit body. The wire is coiled on the floor and is then reinserted out through the other opening in the conduit body and pulled. The gasket and cover are then reinstalled.

However, due to the often heavy gauge of the wiring, the wires often become tangled or are difficult to bend in order to fit into the conduit body. Since wiring without a proper junction point is in violation of safety codes for almost all types of construction, the labor intensive work of fitting the wires to the prior art conduit body and junction point is required.

Where an LB type conduit body is involved, the most labor intensive part of fitting the conduit body is the bending of wire/conduit through a sharp 90° turn within the confines of the typical LB box. Accordingly, there is a need in the art for a novel, non-obvious and improved conduit body that reduces the amount of such labor-intensive activity.

Multiple conduits are often mounted parallel to, or at least adjacent to, each other and when there is a side conduit from a T-type conduit body there is often a space conflict with the adjacent conduits. To accommodate this type of situation the T-type conduit box with the third branch is first rotated about its longitudinal axis to permit the side conduit to clear the adjacent conduits, and then the side conduit must be bent to pass under or over nearby conduits. This situation also occurs with an L-type conduit body with two pieces of conduit where one of the conduits is parallel or adjacent to other conduits and then there is a ninety-degree for its other piece of conduit. The L-type conduit body must be rotated about one of its two pieces of conduit and its other piece of conduit must be bent to pass under or over nearby conduits. There are many other similar installation examples in which conduit bodies must be rotated and the conduit connected to these conduit bodies must be bent to avoid space conflicts with adjacent conduit.

However, making such bends in conduit is time consuming and electrical codes restrict the number of bends in conduit between pull points. In addition, having to rotate the conduit bodies too often makes it more difficult to handle the wiring being routed through the conduit bodies after removing the top cover of the conduit body.

Thus, there is a need in the art for an improved conduit body that minimizes or eliminates the need for rotating conduit bodies and eliminates the need for bending of conduit in electrical installations to promote faster and easier installation of conduit bodies, conduit and wiring.

SUMMARY OF THE INVENTION

The subject need in the art for an improved conduit body that minimizes or eliminates the need for bending of conduit in electrical installations is met by the present invention.

The conduit body of the present invention may be either an L-type, T-type or X-type conduit body. The novel difference with the prior art is that with the novel T-type conduit body the three conduits connected thereto do not lie in the same plane. There is a vertical offset between the two, generally collinear, conduits and the third, right angle offset conduit. The vertical offset is accomplished in the novel T-type conduit body itself. Thus, the two collinear pieces of conduit remain parallel to other nearby conduit and the third, right angle, offset conduit passes under or over the nearby conduit without having to be bent.

With the novel L-type conduit body the difference with the prior art is that the two pieces of conduit connected thereto do not lie in the same plane. There is a vertical offset between one of the two conduits and the other of the two conduits. The vertical offset is accomplished in the novel L-type conduit body itself. Thus, the one of two pieces of conduit remain parallel to other nearby conduit and the right angle piece of conduit passes under or over the nearby conduit without having to be bent.

With a prior art X-type conduit body there are four ports that all lie in one plane and each port is angularly spaced ninety-degrees from another port in a plus sign configuration. With the novel X-type conduit body there can be a few variants. The preferred variant is with two of the four ports can be in one plane and the other two ports are offset into a second plane. The axis of the ports in each plane of the preferred variant are collinear. Alternatively, the two ports in each of the two offset planes can have their port axis in either a collinear or non-collinear configuration. Alternatively, three of the four ports can be in one plane and the other ports can be offset into a second plane.

The vertical offset accomplished in the novel T-type, L-type and X-type conduit bodies also minimizes or eliminates the need to rotate the conduit bodies, as must be done in the prior art. This minimizes any difficult in handling wiring passing through the conduit bodies after removing the top cover of the conduit body.

DESCRIPTION OF THE DRAWING

The invention will be better understood upon reading the following Detailed Description in conjunction with the drawing in which.

DETAILED DESCRIPTION

Figure 1:
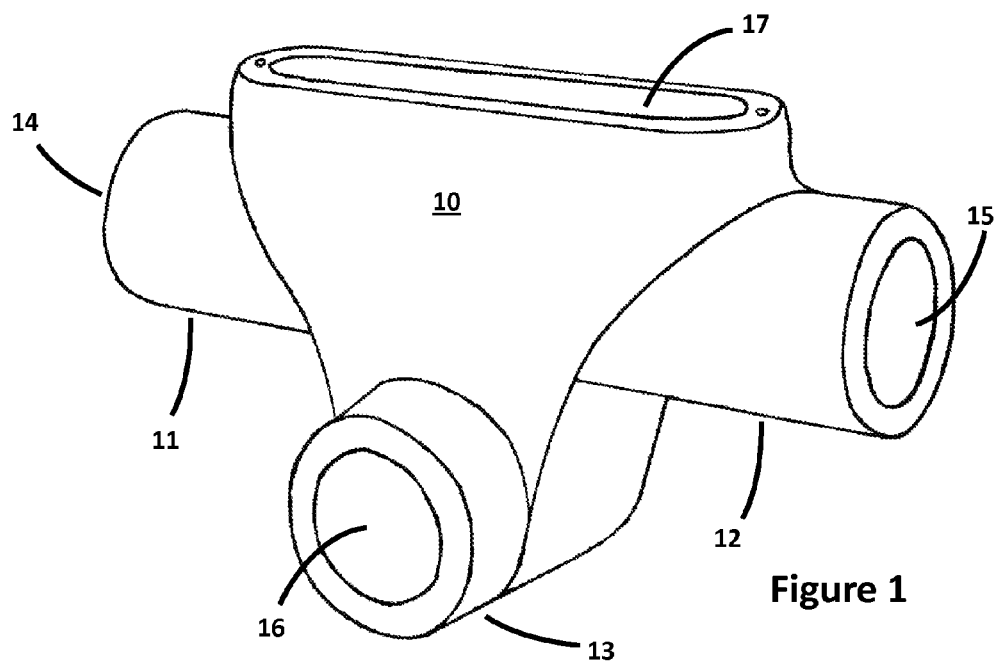
FIG. 1 is a three dimensional view of a T-type conduit body of the present invention.

FIG. 1 is a three dimensional view of a T-type conduit body 10 of the present invention. There can be second variant of this T-type conduit body 10, not shown, where offset conduit port 13 of the conduit body 10 points in the opposite direction from that shown in FIG. 1.

The T-type conduit body 10 shown in FIG. 1 has a left conduit port 11, a right conduit port 12, and an offset conduit port 13 that does not lie in the same plane as co-linear conduit ports 11 and 12. Offset conduit port 13 faces in a direction that is perpendicular to the common axis of conduit ports 11 and 12, alike the prior art, but is offset in the downward direction as shown, which is not done in the prior art. The purpose of the offset will be better understood in viewing FIGS. 2 and 6 and reading the description for those figures. Alike prior art conduit bodies there is a conduit body access hole 17 that is used to access the interior of conduit body 10 for pulling wires through conduit connected to conduit body 10 at ports 11, 12 and 13, and routing the wires between the three ports in an manner known in the art.

Figure 6:
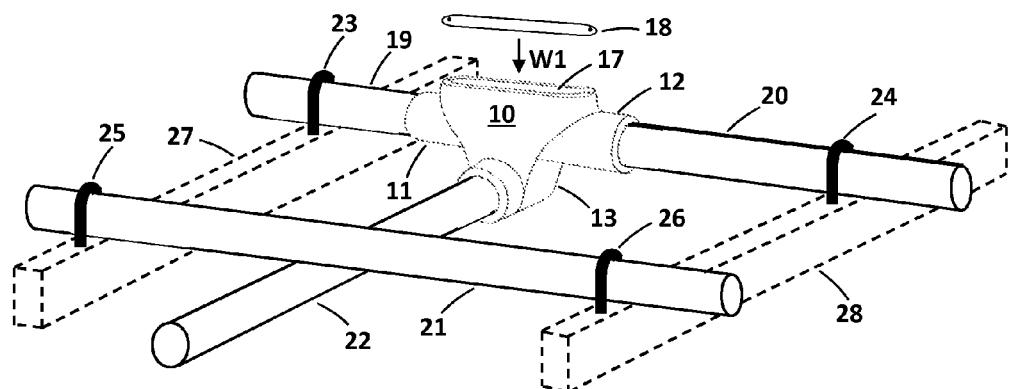
FIG. 6 show a typical installation of the novel T-type conduit body in which the conduit body does not have to be rotated and the conduit that branches at ninety degrees does not have to be bent to maintain it generally parallel to other conduits and a wall or ceiling to which they are attached.

Not shown in FIG. 1 is a typical conduit body access hole cover 18, but it is shown in FIG. 6. Such covers 18 are well known in the art but is not shown in FIG. 1 to avoid detracting from the novel offset conduit body 10. There is typically a gasket, not shown but known in the art, between cover 18 and body 10 to provide a water tight seal. Cover 18 is fastened to conduit body using screws (not shown) or other fastening means well known in the art.

The end of a piece of conduit, not shown in FIG. 1 but shown in FIG. 6, is inserted into the open end of each of conduit ports 11, 12 and 13 at their respective openings 14, 15 and 16. No details are shown on how to fasten the conduit into the openings of the three conduit ports 14, 15 and 16 because there is more than one way known in the art. For example, there may be screws in threaded holes through the side walls of each of ports 11, 12 and 13 that are screwed into the side wall of conduit inside openings 14, 15 and 16 to fasten the conduit inside the openings of the ports. Alternatively, the interior walls of openings 14, 15 and 16 of ports 11, 12 and 13 each may be threaded and threaded conduit ends are screwed into the openings 14, 15 and 16.

Figure 2:
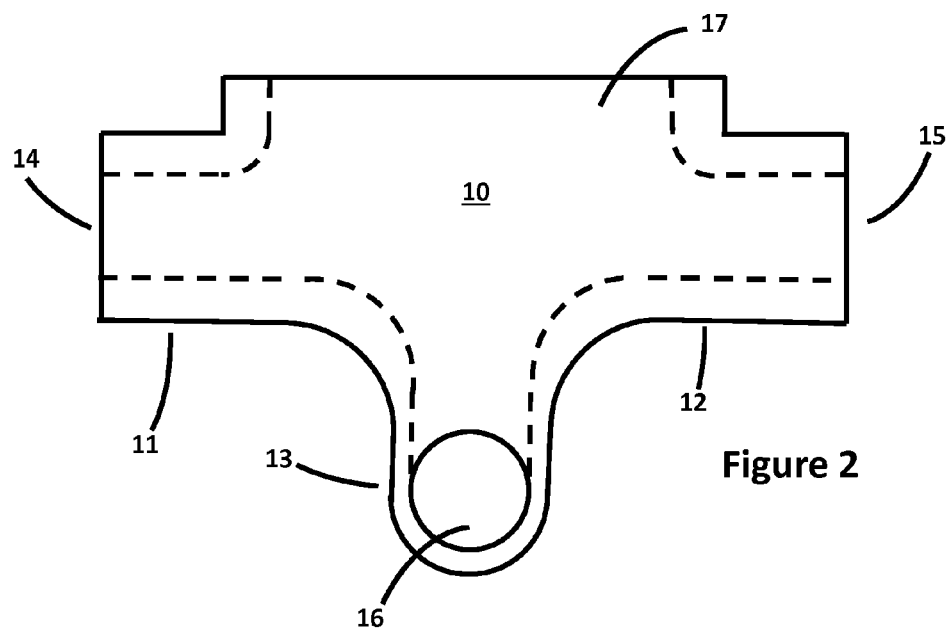
FIG. 2 is a side phantom view of the T-type conduit body of the present invention showing the vertical offset between the two collinear branches of the conduit body and the third, ninety degree branch of the conduit body.

FIG. 2 is a side phantom view, not a cutaway view, of T-type conduit body 10 of the present invention showing the hollow interior of body 10 to best show the vertical offset between the two collinear ports 14 and 15 of conduit body 10 and the third, offset right angle port 16 of conduit body 10. The value of this offset will be better understood when viewing FIG. 6 and reading the description thereof.

Figure 3:
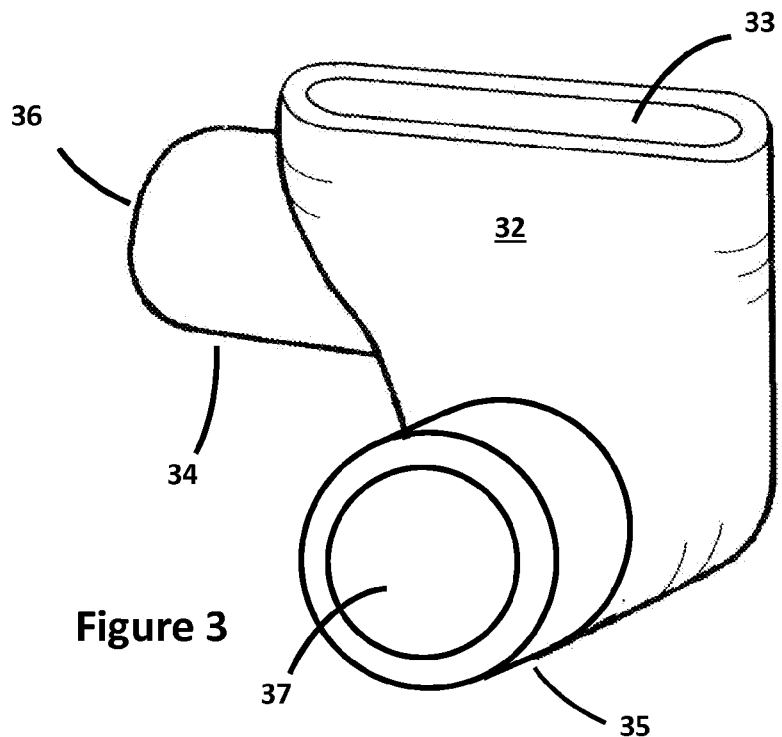
FIG. 3 is a three dimensional view of an L-type conduit body of the present invention.
Figure 4:
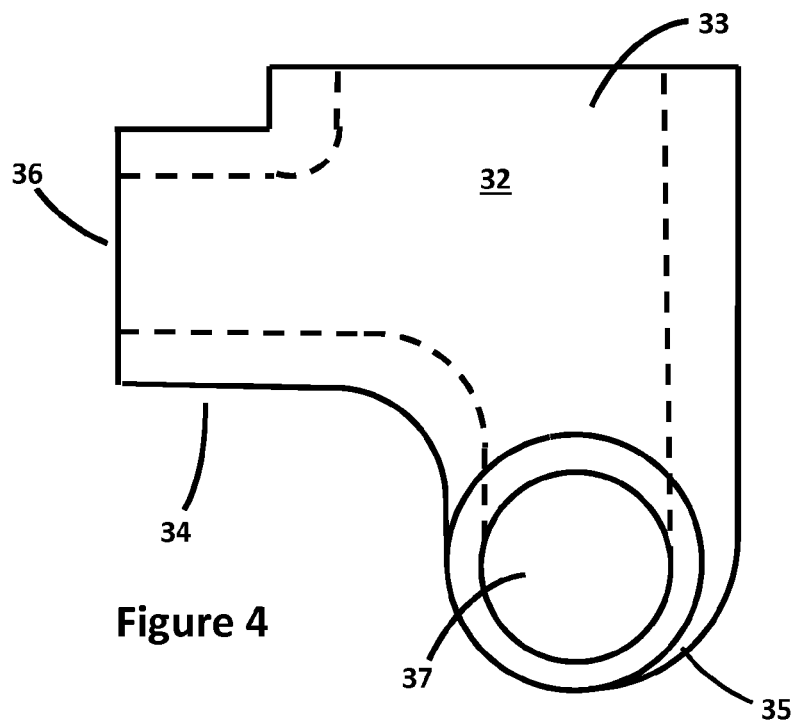
FIG. 4 is a side phantom view of the L-type conduit body of the present invention showing the vertical offset between the two branches of the conduit body.
Figure 7:
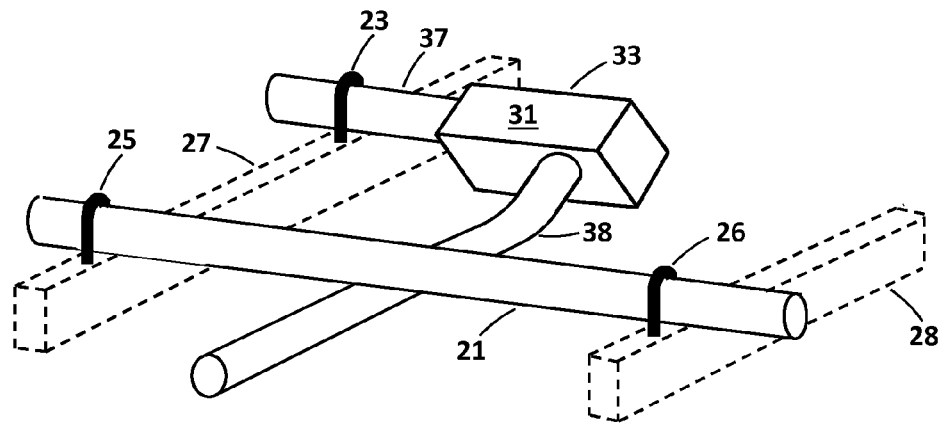
FIG. 7 shows a typical installation of a prior art L-type conduit body in which the conduit body must be rotated and the conduit that branches at ninety degrees must be bent to maintain it generally parallel to other conduits and a wall or ceiling to which they are attached.
Figure 8:
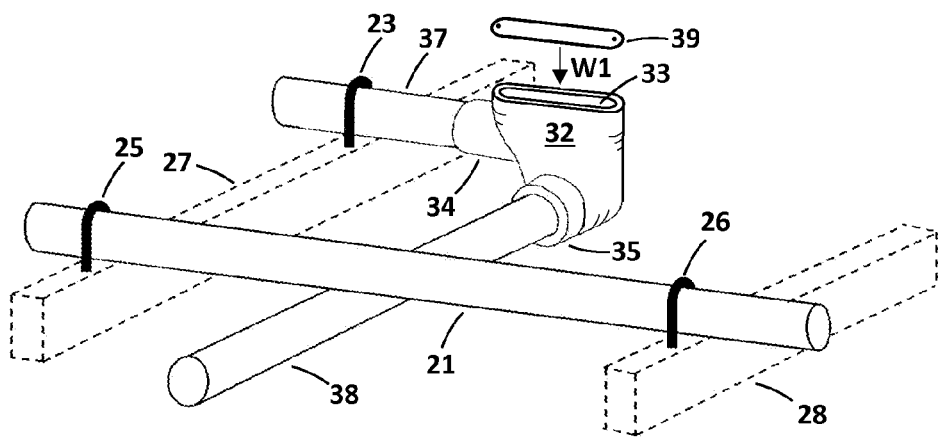
FIG. 8 shows a typical installation of the novel L-type conduit body in which the conduit body does not have to be rotated and the conduit that branches at ninety degrees does not have to be bent to maintain it generally parallel to other conduits and a wall or ceiling to which they are attached.

FIG. 3 is a three dimensional view of an L-type conduit body 32 variant of the present invention. Body 32 has a first left conduit port 34 with an opening 36, and an offset conduit port 35 with an opening 37. Conduit port 35 points in a direction that is perpendicular to conduit port 34 but, unlike the prior art, is offset in the downward direction as shown in FIGS. 3 and 8. In prior art L-type conduit bodies the axis of the two openings of the two ports lie in the same plane as shown in FIG. 7. The purpose will be better understood in viewing FIG. 8 and reading the descriptions therefor.

Alike prior art conduit L-type bodies there is a conduit body access hole 33 that is used to access the interior of conduit body 32 for pulling wires through conduit (not shown) connected to conduit body 32 at ports 34 and 35, and routing the wires between the two ports in an manner well known in the art.

Not shown in FIG. 3 is a typical conduit body access hole cover 38 that is shown in FIG. 8. Cover 38 mounts over a conduit body access hole 33 in a manner well known in the art. Such covers 38 are well known in the art so one is not shown in FIG. 1 to avoid detracting from the novel L-type conduit body 32. There is typically a gasket, not shown but known in the art, between cover 36 and body 32 to provide a water tight seal at hole 33. Cover 38 is fastened to conduit body 32 using screws (not shown) or other fastening means well known in the art.

The end of pieces of conduit 37 and 38, not shown in FIG. 3 but shown in FIG. 8, is inserted into each of conduit ports 34 and 35 at their holes 36 and 37. No details are shown on how to fasten the conduit into the two conduit ports because there is more than one way known in the art. For example, there may be screws through the side walls of each of ports 34 and 35 that are screwed into the side wall of conduit to fasten the conduit into the port. Alternatively, the interior walls of openings 36 and 37 of ports 34 and 35 respectively may be threaded and threaded conduit ends are screwed into the openings.

Figure 5:
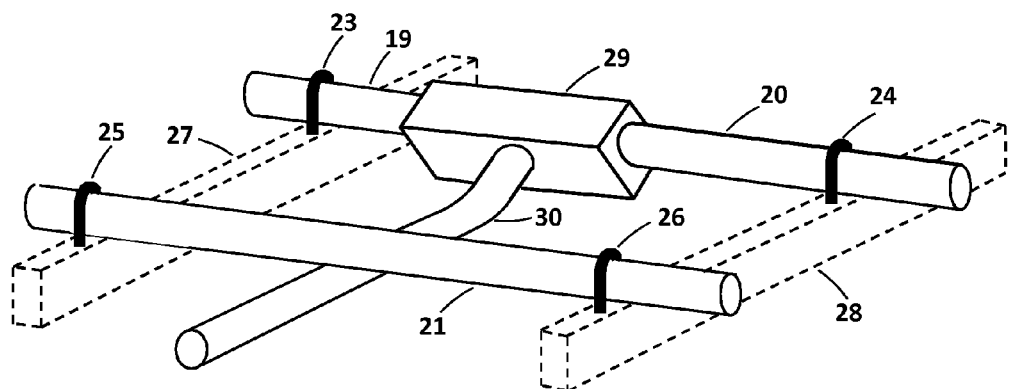
FIG. 5 show a typical installation of a prior art T-type conduit body in which the conduit body must be rotated and the conduit that branches at ninety degrees must be bent to maintain it generally parallel to other conduit and to a wall or ceiling to which they are attached.

In FIG. 5 is shown a typical installation of a prior art T-type conduit body 29 in which the conduit body 29 must be rotated as shown, and the conduit 30 that branches at ninety degrees must first be bent as shown to clear conduit 21 and to maintain conduit 30 generally parallel to other conduits 19, 20 and 12 or to a wall or ceiling to which they are attached. In FIG. 5 there are well known conduit mounting means 27 and 28 that are fastened to a wall, ceiling or other surface. Conduits, such as 19, 20 and 21, are fastened to the conduit mounting means 27 and 28 using fasteners 23-26. No details are shown of conduit mounting means 27 and 28 and fasteners 23-26 since they are all well known in the art and there a number of different ones known in the art that may be utilized. In FIG. 5 prior art T-type conduit body 29 may be rotated to a different position than shown so that bent conduit 30 is above conduit 21 rather than below it, or may go in the opposite direction.

In FIG. 6 is shown a typical installation of the novel T-type conduit body 10 in which the conduit body 10 does not have to be rotated and conduit 22 that branches therefrom at ninety degrees does not have to be bent to pass under conduit 21. Also shown are conduit mounting means 27 and 28 that are fastened to a wall, ceiling or other surface and conduits, such as 19, 20 and 21, are fastened to the conduit mounting means 27 and 28 using fasteners 23-26. No details are shown of conduit mounting means 27 and 28 and fasteners 23-26 since they are all well known in the art and there a number of different ones known in the art. It can easily be appreciated that by rotating conduit body 10 horizontally by one-hundred eighty degrees conduit 22 will go in the direction opposite to that shown. This can be done while maintaining conduit cover 18 in the upright position shown. It can also be appreciated that by rotating novel T-type conduit body 10 vertically by one-hundred eighty degrees that conduit 22 will pass over the top of conduit 21. In all these examples conduit 22 never has to be bent, unlike when using prior art conduit bodies. The height of conduit mounting means 27 and 28 must be greater than the diameter of conduit 22 to permit proper clearance for conduit 22 is to pass under conduit 21. To facilitate this, the vertical distance between the central axis of collinear ports 11 and 12 and offset port 13 in FIG. 6, and the distance between the axis of ports 34 and 35 in FIG. 8 must also be greater than the diameter of conduit 22 in both Figures. The dimensions are interrelated for this to function properly.

In FIG. 7 is shown a typical installation of a prior art L-type conduit body 31 in which the conduit body 31 must be rotated and the conduit 30 that branches therefrom at ninety degrees must be bent to permit it to pass under or over other conduits such as 21. Also shown are well known conduit mounting means 27 and 28 that are fastened to a wall, ceiling or other surface, and conduits, such as 19 and 21, are fastened to the conduit mounting means 27 and 28 using fasteners 23, 25, 26. No details are shown of conduit mounting means 27 and 28 and fasteners 23, 25, 26 since they are all well known in the art and there a number of different ones known in the art.

In FIG. 8 is shown a typical installation of the novel L-type conduit body 32 in which the conduit body 32 does not have to be rotated and conduit 22 that branches therefrom at ninety degrees does not have to be bent to get it over or under an adjacent piece of conduit 21 that is parallel to the other conduits, such as 21. Also shown are well known conduit mounting means 27 and 28 that are fastened to a wall, ceiling or other surface, and conduits, such as 19 and 21, are fastened to the conduit mounting means 27 and 28 using fasteners 23, 25, 26. No details are shown of conduit mounting means 27 and 28 and fasteners 23, 25, 26 since they are all well known in the art and there are a number of different ones known in the art. Even when novel conduit box 32 is rotated horizontally one-hundred eighty degrees to route conduit 28 in the direction opposite to that shown in FIG. 8 conduit 28 still does not have to bent. The height of conduit mounting means 27 and 28 must be greater than the diameter of conduit 22 to permit proper clearance when conduit 22 is to pass under conduit 21. The height of conduit mounting means 27 and 28 must be greater than the diameter of conduit 22 to permit proper clearance for conduit 22 is to pass under conduit 21. To facilitate this, the vertical distance between the central axis of collinear ports 11 and 12 and offset port 13 in FIG. 6, and the distance between the axis of ports 34 and 35 in FIG. 8 must also be greater than the diameter of conduit 22 in both Figures. The dimensions are interrelated for this to function properly.

While for the T-type and L-type embodiments of the novel offset conduit bodies described herein the axis of at least one port of either of the bodies is perpendicular and offset from the axis of the other ports. In alternative embodiments of the invention the axis of the at least one port may by at an angle other than perpendicular to the axis of the one or both of the other ports. In addition, while the conduit shown and described herein are all of the same diameter, an offset conduit body may have ports of different diameters for conduit of different diameters.

Figure 9:
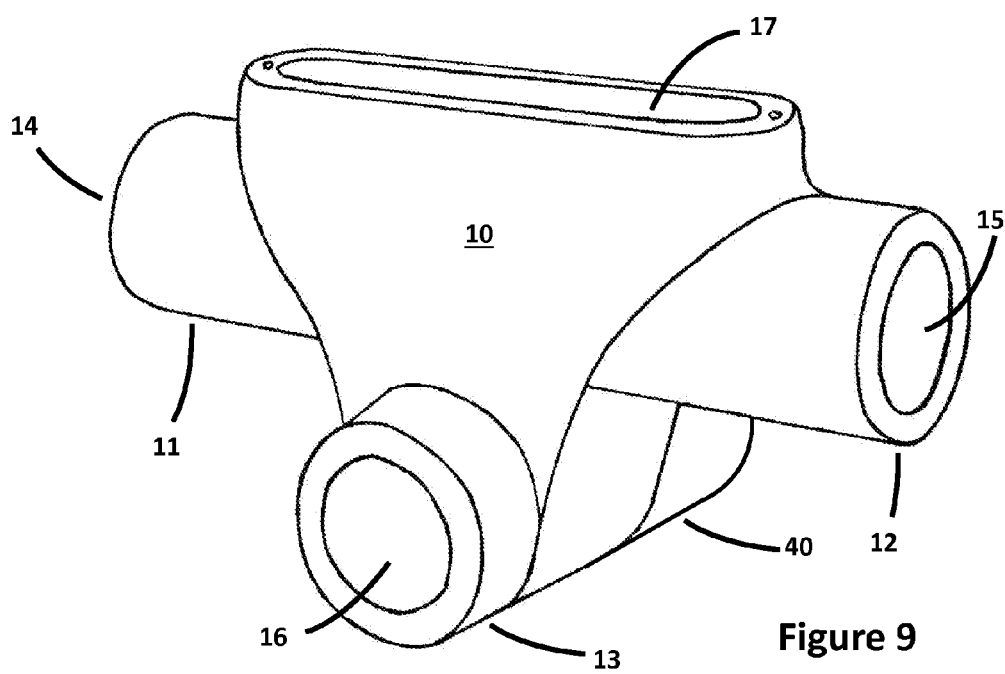
FIG. 9 shows a three dimensional view of an X-type conduit body of the present invention.

FIG. 9 is a three dimensional view of an X-type conduit body 10 of the present invention that has previously been mentioned as a second variant of the T-type conduit body.

The X-type conduit body 10 shown in FIG. 9 has a left conduit port 11 and a right conduit port 12 that are co-axial, a first offset conduit port 13 and a second offset conduit port 40 that are coaxial but they do not lie in the same plane as co-axial conduit ports 11 and 12. Offset conduit ports 13 and 40 face in a direction that is perpendicular to the common axis of conduit ports 11 and 12 but they are offset in the downward direction as shown. The purpose of the offset has previously been described with reference to FIGS. 1, 2 and 6. Alike prior art conduit bodies there is a conduit body access hole 17 that is used to access the interior of "X"-type conduit body 10 for pulling wires through conduit connected to conduit body 10 at ports 11, 12, 13 and 40 and routing the wires between the four ports in an manner known in the art.

Not shown in FIG. 9 is a typical conduit body access hole cover 18, but one is shown in FIG. 6. Such covers 18 are well known in the art but is not shown in FIG. 9 to avoid detracting from the novel offset conduit body 10. There is typically a gasket, not shown but known in the art, between cover 18 and body 10 to provide a water tight seal. Cover 18 is fastened to conduit body using screws (not shown) or other fastening means well known in the art.

While what has been described herein are three variants of the preferred embodiment of the invention those skilled in the art will appreciate that numerous changes may be made without departing from the spirit and scope of the invention.

The invention claimed is:

1. A conduit body for interconnecting conduit through which wires are routed, the conduit body comprising a hollow housing having only four ports through its side walls, each port having an axis, where the axis of a first and second of the four ports are coaxial with each other and the axis of a third port is not coaxial with the axis of the first and second ports and the axis of the third port does not intersect with the axis of the first and second ports but is offset from the axis of the first and second ports and therefor does not lie in a common plane with the coaxial axis of the first and second ports, the fourth port is an installation port through the conduit body side wall having its only purpose to access the interior of the conduit body to facilitate pulling wires through the conduit body, the fourth port being of a size and being positioned to easily pull wires input at any one of the first, second and third ports and to route the same wires to and out another one of the first, second and third ports; the fourth port having a removable cover, wherein the hollow housing of the conduit body has smooth walls with no obstructions between any of the three ports so that wires may be easily and safely routed in any one of the three ports and out any of the remaining two ports; and when conduit is connected to the first, second and third ports and there is other conduit that is adjacent to the conduit body, due to the offset of the third port from the first and second ports the conduit connected to the third port need not be bent in order to be clear of the other conduit.

2. The conduit body of claim 1 wherein the axis of the offset third port is perpendicular to the axis of the first and second ports.

3. The conduit body of claim 2 wherein the other conduit that is adjacent to the conduit body is parallel to the conduit connected to the first and second ports.

4. The conduit body of claim 1 wherein the other conduit that is adjacent to the conduit body is parallel to the conduit connected to the first and second ports.

5. A conduit body comprising a hollow housing having only a first port, an offset second port, and a third port through its side walls, each port having an axis, where the axis of the first and second ports are not collinear with each other and are offset from each other; the third port through the conduit body side wall having its only purpose to access the interior of the conduit body to facilitate pulling wires through the conduit body between the first port and the second port, the third port having a removable cover, the third port being of a size and being positioned to easily pull wires input at either the first and second ports and to route the same wires to and out the other of the first and second ports; wherein the hollow housing of the conduit body has smooth walls with no obstructions between the first, second and third ports so that wires may be easily and safely routed in one of the first and second ports and out the other of the first and second ports; and wherein when conduit is connected to the first and offset second ports and there is other conduit that is adjacent to the conduit body and, due to the offset of the second port from the first port the conduit connected to the second port need not be bent in order to be clear of the other conduit.

6. The conduit body of claim 5 wherein the axis of the offset second port is at an angle perpendicular to the axis of the first port.

7. The conduit body of claim 6 wherein the other conduit that is adjacent to the conduit body is parallel to the conduit connected to the first port.

8. The conduit body of claim 5 wherein the other conduit that is adjacent to the conduit body is parallel to the conduit connected to the first port.

9. A conduit body comprising a hollow housing having only five ports through its side walls, each port having an axis, where there is a first port and a second port of the five ports and the axis of the first port and the second port are coaxial with each other, where there is a third port and a fourth port of the five ports and the axis of the third port and the fourth port are coaxial with each other but the coaxial axis of the first port and the second port is offset from all the coaxial axis of the third port and the fourth port, so the coaxial axis of the first and second ports do not intersect the coaxial axis of the third and fourth ports and therefor do not lie in a common plane, the conduit body fifth port being an installation port through the conduit body side wall having its only purpose to access the interior of the conduit body to facilitate pulling wires through the conduit body, the installation port having a removable cover, the installation port being of a size and being positioned to easily pull wires input at any one of the first through fourth ports and to easily route the same wires to and out another one of the first through fourth ports, wherein the hollow housing of the conduit body has smooth walls with no obstructions between any of the first or second group of ports so that wires may be easily and safely routed between any one of the first through fourth ports.

10. The conduit body of claim 9 wherein the axis of at least some of the ports of the second group of ports is perpendicular to the axis of at least some of the first group of ports.

11. The conduit body of claim 10 wherein the other conduit that is adjacent to the conduit body is parallel to at least some of the conduit of the first group of conduit.

12. The conduit body of claim 9 wherein the other conduit that is adjacent to the conduit body is parallel to at least some of the conduit of the first group of conduit.

* * * * *